Patented July 4, 1933

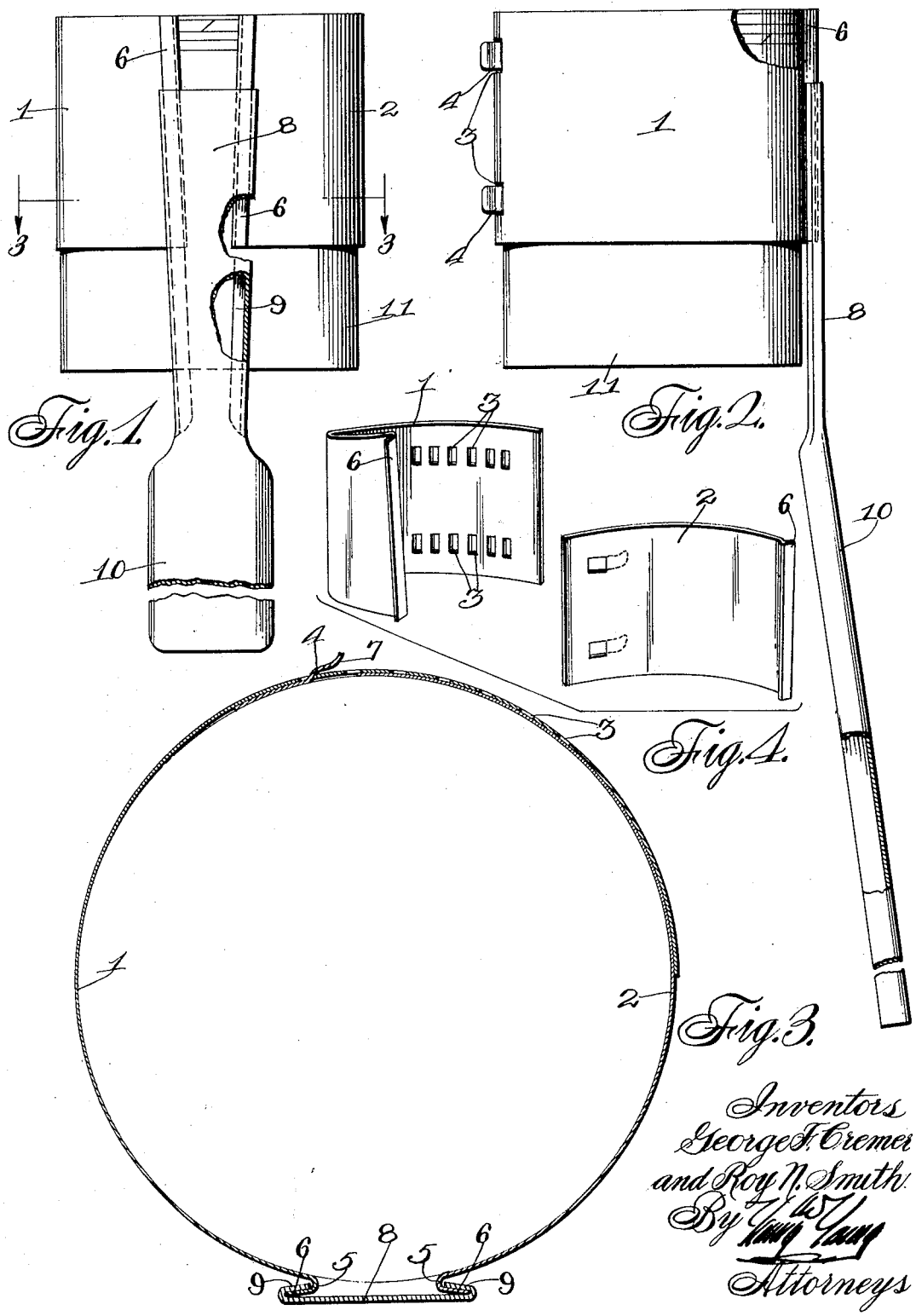

1,916,827

UNITED STATES PATENT OFFICE

GEORGE F. CREMER, OF MILWAUKEE, WISCONSIN, AND ROY N. SMITH, OF SAN FRANCISCO, CALIFORNIA

PISTON RING COMPRESSOR

Application filed February 4, 1931. Serial No. 513,328.

This invention relates to an improved piston ring compressor.

One of the objects of the present invention is the provision of an improved piston ring compressor which is adapted to be engaged with a piston for compressing the rings thereof into the grooves of the piston flush with the exterior surface thereof so that the piston may be readily inserted into its respective cylinder, either from the top or the bottom.

Another object of the present invention is the provision of a piston ring compressor which can be clamped to the exterior of pistons of different diameters for compressing the rings thereof into the grooves into the piston and the device is such that it may be readily inverted in its position on the piston whereby the piston can be inserted into its respective cylinder from either end thereof.

With the above and other objects in view, the invention consists in the novel features of construction, the combination and arrangement of parts hereinafter more fully set forth, pointed out in the claim and shown in the accompanying drawing wherein:

Figure 1 is a front elevation of our improved device illustrating its application to a piston with parts thereof broken away and illustrated in cross section;

Figure 2 is a side elevation with parts broken away and shown in cross section;

Figure 3 is an enlarged sectional view of the clamping sleeve on the line 3—3 of Figure 1; and, Figure 4 is a perspective view of the detachable sections of the clamping sleeve.

As stated heretofore, this invention is particularly designed for compressing rings in pistons so that the pistons can be readily inserted into their respective cylinders and the device includes in its construction, a compressing sleeve of two separable semi-circular members 1 and 2, the member 1 being somewhat longer than the member 2 and provided with spaced rows of apertures 3. The section 2 is provided adjacent its inner end with laterally projecting tongues 4 which are struck out from the body of the member 2 for engagement with any one of the apertures 3.

It will be noted that the tongues 4 are arranged in spaced relation so as to readily align with the two lines of apertures in the member 1.

Both of the members 1 and 2 are provided at, what will be known as their outer edges with arcuate curved portions 5 and outwardly of the curved portions suitable inclined flanges 6 are provided and these flanges are so arranged that when the two parts are fitted together, as shown in Figure 3, the flanges 6, as well as the arcuate parts 5 converge toward one end of the sleeve.

In fitting the parts 1 and 2, together, the tongues 4 may be engaged in any set of apertures 3 and in order to facilitate the insertion of the tongues 4 in the apertures, the outer ends of the tongues are provided with curved portions 7 which will permit the tongues to readily ride into the apertures 3 and as the members 1 and 2 are urged apart, the tongues 4 will assume the position shown in Figure 3.

In order to move the outer ends of the members 1 and 2 toward each other when in operative position, as shown in Figures 1 and 2, we provide a clamping jaw 8 having tapered jaw portions 9 which converge toward the handle 10. Therefore, it will be noted that the outer end of the jaw 8 can be engaged with the flanges 6 on the members 1 and 2, as shown in Figure 1 and by urging the jaw 8 transversely of the sleeve, the members 1 and 2 will be urged toward each other, and as this operation is carried out when the sleeve is applied to a piston, the rings of the piston will be readily compressed into the grooves thereof, so that the piston may be readily inserted into a cylinder.

In Figures 1 and 2, it will be noted that the device is applied to the piston 11, so that the piston can be inserted from the bottom of the cylinder block, the device being fitted tightly against the bottom of the block with the piston aligned with the cylinder and the piston 11 being pushed upwardly from the clamping sleeve, the sleeve holding the rings in position until they have passed into the cylinder. When the device is to be used for inserting a piston from the top, the relative position of the handle 10 is reversed as well as the sleeve, so that the flanges 6 are arranged to converge toward the opposite end of the piston from that shown in Figures 1 and 2. The handle 10 will then be extending from the piston in a direction opposite to the showing in Figure 2. In this instance, the lower end of the piston is first inserted in the upper end of the cylinder, and as the piston is forced downward, the compressing sleeve is gradually slid upward until the entire piston with its rings is inserted in place. The piston can now be forced to the lower end of the cylinder until its skirt is exposed after which the piston rod can be connected therewith.

It will be apparent from the foregoing that we have provided a very simple and inexpensive compressing member for application to pistons, where it is desired to compress the rings of the piston so that the pistons can be quickly and readily inserted into the cylinder either from the top of the cylinder or from the bottom. The device is extremely simple in construction and it is believed that it can be manufactured and placed on the market at a very low cost.

While we have shown and described the preferred embodiment of our invention, it will be apparent from the foregoing that slight changes may be made in the construction when putting the invention into practice without departing from the spirit of the same or the scope of the appended claim.

We claim:

As a new article of manufacture, a piston ring compressor comprising a sleeve including a pair of semi-circular companion sections, one of said sections having a series of spaced openings formed therein, the other of said sections having struck-out tongues for selective engagement within the openings, out-turned flanges formed on facing ends of the sections, and a manipulating handle having a flat shank portion provided with converging guide channels on its side edges for receiving the flanges, and an integral hand grip formed on one end of the shank extending at an angle thereto.

In testimony that I claim the foregoing I have hereunto set my hand at Milwaukee, in the county of Milwaukee and State of Wisconsin.

GEORGE F. CREMER.

In testimony that I claim the foregoing I have hereunto set my hand at Los Angeles, in the county of Los Angeles, and State of California.

ROY N. SMITH.